United States Patent [19]

Wahl et al.

[11] Patent Number: 5,281,465
[45] Date of Patent: Jan. 25, 1994

[54] METHOD OF STRENGTHENING AN OPTICAL BODY BY DIFFUSION OF MATERIAL TO THE DEPTH OF STRUCTURAL FLAWS FORMED IN SUCH BODY

[75] Inventors: Joseph M. Wahl, Shirley; Randal W. Tustison, Lexington; Thomas Y. Wong, Needham; Charles B. Willingham, Framingham, all of Mass.

[73] Assignee: Raytheon Company, Lexington, Mass.

[21] Appl. No.: 969,550

[22] Filed: Oct. 30, 1992

[51] Int. Cl.$^5$ .............................................. B05D 5/06
[52] U.S. Cl. ................................. 427/162; 427/164; 427/376.6; 427/383.1
[58] Field of Search .................. 427/162, 376.6, 393.1, 427/164

[56] References Cited

U.S. PATENT DOCUMENTS

| | | | |
|---|---|---|---|
| 4,772,080 | 9/1988 | Tustison | 427/250 |
| 4,778,731 | 10/1988 | Krastz et al. | 428/623 |
| 4,889,746 | 12/1989 | Utsumi et al. | 427/162 |
| 4,944,900 | 7/1990 | Willingham et al. | 264/62 |
| 5,067,781 | 11/1991 | Montanari et al. | 427/160 |

FOREIGN PATENT DOCUMENTS 2156383A  2/1984  United Kingdom .

OTHER PUBLICATIONS

Stress in $Y_2O_3$ thin films deposited by radio-frequency magnetron and ion beam sputtering. R. W. Tutison, T. E. Varitimos, D. G. Montanari, and J. M. Wahl. J. Vac. Sci. Technol. A 7(3) May/Jun. 1989.

*Primary Examiner*—Shrive Beck
*Assistant Examiner*—Benjamin L. Utcih
*Attorney, Agent, or Firm*—Richard M. Sharkansky

[57] ABSTRACT

A technique for increasing the strength of long wavelength infrared material, such as zinc sulfide and zinc selenide includes diffusing species which are applied to the materials as thin films into the zinc sulfide and zinc selenide material. Portions of the thin film material are thermally diffused to substantial depths of up to 100 microns below the depth of flaws formed in the body using one of two diffusion techniques. One diffusion technique uses hot isostatic pressure and the other uses a heat treatment carried out at or near ambient pressure in an inert atmosphere, such as argon or other suitable inert gas.

13 Claims, 2 Drawing Sheets

METHOD OF STRENGTHENING AN OPTICAL BODY BY DIFFUSION OF MATERIAL TO THE DEPTH OF STRUCTURAL FLAWS FORMED IN SUCH BODY

The Government has rights in this invention pursuant to Contract No. N00014-87-C-0251 awarded by the Department of the Navy.

This application is a continuation of application Ser. No. 614,187 filed Nov. 14, 1990 now abandoned.

BACKGROUND OF THE INVENTION

This invention relates generally to optical elements and more particularly to strengthening of optical elements.

As it is known in the art, optical imaging systems generally include one or more externally mounted optical elements which shield the remainder of the imaging system from an external environment. For example, with infrared airborne imaging systems, an IR transparent optical element, such as a window or dome, is generally mounted on the airborne system to isolate the remainder of the imaging system from exposure to humid, corrosive, and abrasive environments. Moreover, the element is also provided to isolate the remainder of the imaging system from a aerodynamic environment. Such elements often find applications on missiles, for example.

As system requirements for missile speed increase, the mechanical properties for domes and the like concomitantly increase.

Typically, materials which offer the best mechanical durability and optical performance for infrared imaging systems, in the long wavelength infrared imaging band between 8-12 microns, are limited to a relatively small number of materials. Suitable materials include Group II-VI materials, such as zinc sulfide, zinc selenide, mercury cadmium telluride, and cadmium telluride, Group III-V materials, such as gallium arsenide, gallium phosphide, and Group IV materials, such as germanium. Moreover, certain ternary sulfides having the general chemical formula $MLn_2S_4$ where M is a Group I cation, Ln is a lanthanide rare earth series cation, and S is the $S^{-2}$ sulfide anion are also being used or developed for IR applications in the 8-12 micrometer band. While these ternary sulfide materials have improvements in durability over the aforementioned materials, generally these materials are also relatively susceptible to aerodynamic loading, for example. One feature common to all of the materials is that they are relatively brittle and have relatively low mechanical strengths. Nevertheless, these materials are the best currently available for applications in the 8-12 micron band, principally because they provide the greatest degree of optical transparency.

In particular, zinc sulfide and zinc selenide are the materials of choice for applications requiring transmission in the 8-12 micron band. Although these materials are relatively weak, they have sufficient strength and high enough transmittance characteristics to make them the preferred choice for many of the aforementioned applications. That is, considering optical, physical, and mechanical properties of the materials, zinc sulfide and zinc selenide are currently materials of choice.

Attempts have been made to improve the mechanical properties of these LWIR materials. Such attempts to improve the materials have included providing thick and thin film coatings and compressive coatings of various materials over the LWIR materials, as well as implanting of species into the materials. These procedures have met with some success increasing the strength of these materials by up to approximately 40% and increasing the apparent fracture toughness of these materials by approximately 20%.

It has long been theorized that the actual strength of these materials is limited to a fraction of the theoretical strength principally by material flaws lying at or near the surface of the optical material. These flaws, commonly referred to as the "Griffith" flaw, when they lie near the surface of the substrate are susceptible to propagation through the substrate by tensile components of surface stress waves incident on the surface of the material. Once the flaw starts to propagate, its continued propagation through the material will produce a large crack which leads to a reduction in optical transparency and with sufficient propagation, leads to a catastrophic failure of the element.

SUMMARY OF THE INVENTION

In accordance with the present invention, a method of strengthening a long wavelength infrared (LWIR) material comprises the steps of providing a layer of a diffusible material over a surface of the LWIR material and diffusing portions of s id diffusible material layer into said LWIR material. The remaining undiffused portions of the diffusible material layer ar removed from the surface of the LWIR material. With such an arrangement, a LWIR material body having an improved strength characteristic is provided. The diffusible material which diffuses into the body alters the chemical and/or mechanical characteristics of the LWIR material resulting in improved strength, hardness, and fracture toughness. It is believed that the diffusion of the diffusible material into the LWIR material forms solid solutions, precipitates, places interstitial ions in the crystal structure of the material, or alters grain morphology of the LWIR material. This condition yields an increase in strength, hardness, and fracture toughness for the material without substantially altering the long wavelength optical properties of the LWIR material body.

In accordance with a further aspect of the present invention, a method of strengthening zinc sulfide and zinc selenide comprises the steps of providing a layer of a metal preferably a transitional metal selected from the group consisting of cobalt, iron, chromium, manganese, nickel, and vanadium or a Group III metal such as gallium over a surface of the zinc sulfide or zinc selenide material. Portions of said metal layer are diffused to substantial depths of up to 100 microns through surface portions of the LWIR material. Remaining undiffused portions of the metal layer are removed from the surface of the zinc sulfide and zinc selenide. With such an arrangement, the diffused metal species provides solid solutions, precipitates, interstitial metal ions, or grain morphology changes in surface portions of the zinc sulfide and zinc selenide and alters the strength or state of stress near the surface of the substrate. This arrangement yields bodies of zinc sulfide and zinc selenide having increased strength, hardness, and fracture toughness. Furthermore, after removal of the remaining undiffused portions of the transitional metal layer, the resulting body having the doped region of zinc sulfide or zinc selenide will have long wavelength optical properties substantially the same as an undoped zinc sulfide or zinc selenide body. That is, the long wavelength transmittance (i.e. 8μ to 12μ range) is substantially unaffected by the presence of the dopants.

BRIEF DESCRIPTION OF THE DRAWINGS

The foregoing features of this invention, as well as the invention itself, may be more fully understood from the following detailed description of the drawings, in which.

DESCRIPTION OF THE PREFERRED EMBODIMENTS

Figure 1:
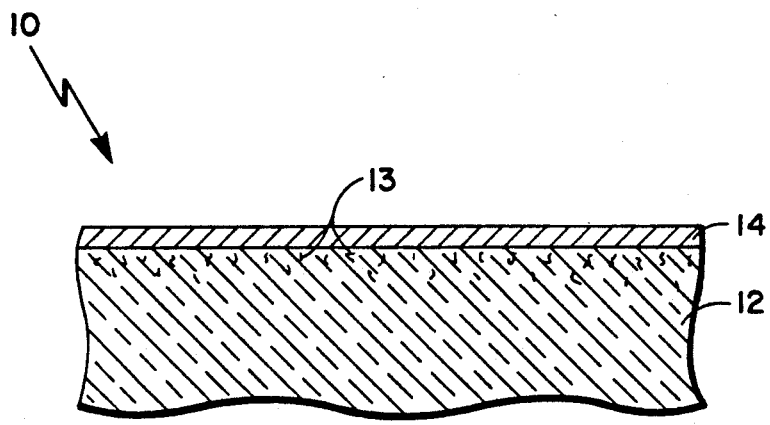
FIGS. 1, 2 and 3 are a series of cross-sectional views showing steps in the fabrication of an optical element having an improved mechanical properties.

Referring now to FIG. 1, a portion 10 of an optical element (not shown) which may be, for example, a window, a lens, a dome and so forth is shown to include a base 12 and having disposed over a major surface of said base a layer 14 comprised of a diffusible species such as a metal and, in particular, a Group III metal such as gallium or a transitional metal. Preferably layer 14 is a transitional metal selected from the group consisting of cobalt (Co), iron (Fe), chromium (Cr), manganese (Mn), nickel (Ni), and vanadium (V) or a Group III metal such as gallium (Ga). These films are applied to the substrate 12 using any known technique. Preferred techniques for depositing the films include ion beam sputtering, RF and DC magnetron sputtering, evaporation, chemical vapor deposition, and plating. As also shown in FIG. 1, substrate 12 includes a plurality of surface or subsurface flaws 13, which may be characterized as the so-called Griffith flaw, that is defects which act as stress concentrators under aerodynamic, droplet impact, or other environmental exposures. Propagation of such flaws through the substrate 12 will cause a reduction in the transmittance of the substrate by increasing internal reflections and, moreover, may result in catastrophic damage to the substrate 12 and thus failure of the optical element.

Figure 2:
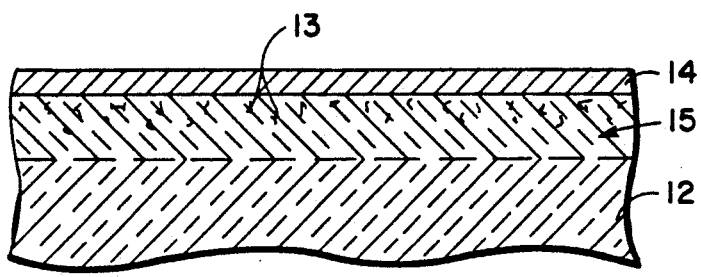
Figure 3:
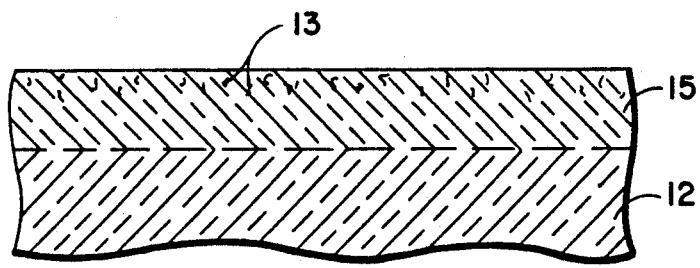

Referring now to FIG. 2, under the application of a diffusion technique, constituents, i.e. atoms, of the metal layer 14 are diffused into surface portions 15 of the substrate 12. Following application of the film, the substrate carrying the film is placed in an inert atmosphere in a furnace and subjected to a treatment to cause the species to diffuse through the substrate. Generally the diffusion occurs for a period of time to cause the diffusions to reach beyond the depth of the surface flaws in the material. For most IR materials, in particular for zinc sulfide and zinc selenide manufactured by the chemical vapor deposition technique, it generally occurs that such flaws occur to depths up to approximately 100 microns. Accordingly, this treatment occurs for a duration sufficient to have such atom diffuse to a surface depth of approximately 100 microns. Two preferred treatments are utilized.

In the first treatment, the optical element is subjected to an elevated pressure at an elevated temperature (i.e. it is hot isostatically pressed). The material is typically hot isostatically pressed (HIPped) for a period of time between 2 hours to 8 hours at a temperature in the range of 800° C. to 1,000° C. and at a pressure of 15,000 psi to 30,000 psi in an inert atmosphere of typically argon or other inert gases. Under application of high isostatic pressures at the elevated temperatures, the grain structure of the zinc sulfide material grows very rapidly. This treatment increases the surface hardness of the material. This treatment, however, generally leads to grain growth and a concomitant lowering in mechanical strength compared to fine grain, untreated material. Accordingly, in order to avoid this situation and thus provide material having an increase in hardness and strength, an alternative diffusion treatment is provided.

That is, alternatively, the heat treatment is carried out at or near an ambient pressure in an inert atmosphere. That is, the sample may be heated for 8 hours up to 24 hours at a temperature in the range of 600° C. to 800° C. in an atmosphere of static or, here, flowing argon or other suitable inert gas at a rate of one liter per minute at approximately atmospheric pressure. The treatment is generally carried out below the chemical vapor deposition temperature of the material of the substrate to inhibit grain growth. The length of time for the treatment is dependent principally upon the extent of penetration into surface portions of the substrate which is desired. In general, the process conditions are chosen to avoid grain growth and other chemical processes which may degrade strength properties and optical properties. As explained above, generally, a penetration of approximately 100 microns is desirable to consume substantially all Griffith flaws.

With either one of these two treatments (i.e. the HIPping for a period of time in the range of 2 hours to 8 hours or the heat treatment for up 24 hours), improvements in hardness and/or strength are provided to the particular materials. This improvement in mechanical properties is provided without significant changes in the optical properties of the resulting material. That is, diffusion of these species provides an improvement in strengths without a corresponding degradation in optical properties of the resulting material.

Samples of chemically vapor deposited zinc sulfide "RAYTRAN" standard grade, obtained from Raytheon Company, were treated with the HIPping treatment, as well as the heat treatment described above. Any LWIR material, as well as, any such material fabricated by chemical vapor deposition or other processes would benefit from such processing mentioned above.

For the HIP treatment, the conditions of the treatment were for a duration of 4 hours at a temperature of 1,000° C. at a pressure of 30,000 psi of argon. The transitional metal, as well as the measured mechanical properties for these samples are set out in Table I.

TABLE I

| Sample No. | Material Type | Hardness (GPa) | Kc (MPa√m) |
|---|---|---|---|
| 1 | Multispectral ZnS | 1.37 | 0.79 |
| 2 | ZnGa$_2$S$_4$/ZnS | 1.83 | (not measured) |
| 3 | Ni/ZnS | 1.77 | 0.62 |
| 4 | Fe/ZnS | 1.50 | 0.88 |

The samples 2-4 were treated with the dopants, as shown. They show increase in hardness and strength (Sample 4) compared to "Multispectral" zinc sulfide obtained from Raytheon Company, Waltham, Mass.

The conditions for the heat treatment were at an ambient pressure and a temperature of approximately 700° C. for 24 hours in an atmosphere of flowing argon. These samples have mechanical characteristics compared to standard, fine grain zinc sulfide as shown in Table II.

TABLE II

| | Hardness (GPa) | Kc (MPa√m) | Strength (MPa) |
|---|---|---|---|
| Std. ZnS | 1.96 | 0.79 | 105.6 |
| Ni/ZnS | 1.60 | 0.79 | 147.9 |
| Fe/ZnS | 1.85 | 0.85 | 136.0 |

Other techniques may be used to provide the dopants into the material which may yield similar results. For example, the dopants could be ion-implanted into the surface portion of the material, or introduced as powder during powder compaction techniques of the base material or added as a dopant vapor during chemical vapor deposition of the base material.

Figure 4:
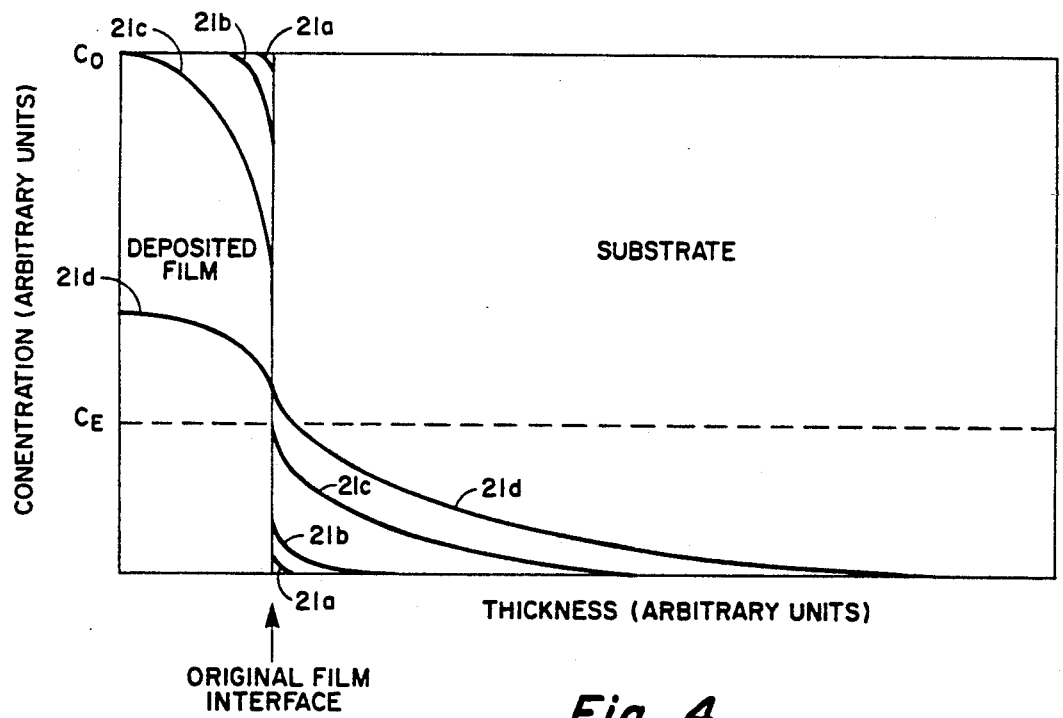
FIG. 4 is a diagrammatical view of dopant profiles typical of an optical element as that shown in FIGS. 2 and 3.

Referring now to FIG. 4, a typical dopant profile is illustrated. Since the amount of diffusion is dependent upon time, temperature, and pressure, various profiles (i.e. depth of diffusion and concentrations of dopant could be provided as illustrated by curves 21a–21d, depicting successively increasing durations of treatment). For each curve the layer of material is assumed to start at an initial concentration $C_0$ and diffuse portions thereof into the substrate. If the treatment is carried on for a sufficient period, it will reach an equilibrium concentration ($E_c$) with the material of the substrate.

The treatments mentioned above, however do not substantially affect the optical transmissivity of the material such as zinc sulfide over the long wavelength region of, here, about $8\mu$ to $12\mu$.

A treatment which improves optical quality of alkaline-earth halides is described in copending application Ser. No. 614,186, filed Nov. 14, 1990, and assigned to the same assignee as the present invention, now abandoned and parent of pending continuation application Ser. No. 809,210, filed Dec. 16, 1991 by J. Wahl, et al., entitled "Zinc Sulfide Bodies Having Improved Optical Transmittance Characteristics and Mechanical Characteristics, filed on the same day herewith and incorporated herein by reference (abandoned), now Ser. No. 985,531 filed Dec. 3,1992 which is a continuation of 809,210 filed Dec. 16, 1991 (now abandoned).

Having described preferred embodiments of the invention, it will now become apparent to one of skill in the ar that other embodiments incorporating their concepts may be used. It is felt, therefore, that these embodiments should not be limited to disclosed embodiments, but rather should be limited only by the spirit and scope of the appended claims.

What is claimed is:

1. A method of treating an optically transparent body, comprising the steps of:
   providing a layer of a diffusible material selected from the group consisting of Co, Fe, Cr, Mn, Ni, and V over a surface of said body;
   thermally diffusing portions of said diffusible material into surface portions of said body; and
   removing remaining, undiffused portions of said diffusible material layer from said body.

2. The method of claim 1 wherein said diffusing step occurs at an elevated pressure and elevated temperature.

3. The method of claim 1 wherein said diffusing step occurs at an elevated temperature and ambient pressure.

4. The method, as recited in claim 1, wherein said diffusible material is diffused to a depth of approximately 100 microns into surface portions of said body.

5. The method recited in claim 1 wherein the body is zinc sulfide or zinc selenide.

6. A method of treating an optically transparent body comprised of zinc sulfide or zinc selenide, comprising the steps of:
   providing a layer of a diffusible material over said surface of said zinc sulfide or zinc selenide body;
   thermally diffusing portions of said diffusible material into surface portions of said zinc sulfide or zinc selenide body;
   removing remaining, undiffused portions of said diffusible material layer from said zinc sulfide or zinc selenide body and,
   wherein said diffusible material is selected from the group consisting of Co, Fe, Cr, Mn, Ni, and V.

7. The method of claim 6 wherein said diffusing step occurs at an elevated pressure and elevated temperature.

8. The method of claim 6 wherein said diffusing step occurs at an elevated temperature and ambient pressure.

9. A method of strengthening a long wavelength infrared (LWIR) transparent body, comprising the steps of:
   providing a layer of a diffusible material over a surface of the IR transparent body;
   thermally diffusing portions of said material into said LWIR transparent body;
   removing undiffused portions of said material from the surface of the LWIR transparent body and,
   wherein said diffusible material is selected from the group consisting of Co, Fe, Cr, Mn, Ni, and V.

10. A method of treating an optically transparent body comprised of zinc sulfide or zinc selenide, comprising the steps of:
    providing a layer of a diffusible material selected from the group consisting of Co, Fe, Cr, Mn, Ni, and V over a surface of said body;
    strengthening said body by thermally diffused portions of said diffusible material into surface portions of said body; and
    removing remaining, undiffused portions of said diffusible material layer from said body.

11. The method of claim 10 wherein said diffusing step occurs at an elevated pressure and elevated temperature.

12. The method of claim 11 wherein said diffusing step occurs at an elevated temperature and ambient pressure.

13. The method, as recited in claim 11, wherein said material is diffused to a depth of approximately 100 microns into surface portions of said body.

* * * * *